3,115,404
INOCULATION WITH MICROORGANISMS AND CULTURE CULTIVATION MEDIA
Clifford R. Carney, 118 W. 159th, Seattle, Wash.
No Drawing. Filed June 21, 1960, Ser. No. 37,557
4 Claims. (Cl. 71—6)

The present invention relates to the inoculation of soil and waste products with microorganisms and culture cultivation media.

The soil and its condition of cultivation have remained constant so long that gradually certain combinations or associations of microorganisms specially adapted to the soil habitat have established themselves. Thus soil has come to have a special microscopic flora and fauna which vary only slightly in different localities and at different times of the year. These associations of microscopic flora and fauna consist of well defined groups of organisms, each with its characteristic function to perform. The combined efforts of all these groups result in complete breakdown of organic remains of plants and animals and of inorganic rock particles, and in the elaboration from them to simple substances so that the carbon, nitrogen and other chemicals can be used again as food for new plants and, subsequently, for animals. In other words, they determine the fertility of the soil.

All biological systems share a set of nutritional requirements with regard to the chemical substances necessary for their growth and normal functioning. These requirements comprise a source of energy, carbon, nitrogen, traces of several metallic elements, vitamins and vitamin-like compounds, and water.

The carbon requirement is satisfied in the form of carbon dioxide or some more complex form such as sugars and other carbohydrates. Plant life utilizes carbon dioxide and by the process of photosynthesis converts it to carbohydrate.

Plants need nitrogen in the form of inorganic salts such as potassium nitrate. Bacteria are extremely versatile in this respect; some types use atmospheric nitrogen, some thrive on inorganic nitrogen compounds, and others derive nitrogen from proteins or practically any naturally occurring organic nitrogen compound.

Microorganisms bring about the transformation of the carbon constituent of plants and animals deposited in the soil to carbon dioxide so that it can again serve as a plant nutrient. The major carbon compound of plant material is cellulose which is attacked by organisms that produce the cellulose enzyme. This group includes bacteria and many fungi. The reactions are a three stage process, the first involving the hydrolizing of cellulose to celloboise by the enzyme cellulose. Then the celloboise is split to glucose by the enzyme celloboise. In the third step glucose is fermented to a variety of end products by many microorganisms. Complete oxidation of glucose yields carbon dioxide and water. Other carbon-containing organic compounds, such as pectins, starch, and glycogen, as well as fats and proteins, are degraded by the metabolic activities of microorganisms; the ultimate release of carbon is also in the form of carbon dioxide.

The transformation of the proteins in plant and animal soil deposits to nitrates, so that the nitrogen in the proteins is again available for plant food, is also brought about by microorganisms. Proteolysis, the first step in this transformation, is accomplished by microorganisms elaborating extracellular proteinases which convert the protein to smaller units of amino acids (peptides), and these are in turn attacked by peptidoses, resulting ultimately in the release of individual amino acids. Peptidoses occur widely in microorganisms, but relatively few bacterial species elaborate potent proteolytic enzymes. Many fungi and soil actinomycetes are extremely proteolytic.

Deamination, the second step in the reduction of proteins to nitrates, has several variations, but one of the end products is always ammonia. Many microorganisms have this ammonification ability. Nitrification, the oxidation of ammonia to nitrate, is an extremely important process from the stand point of soil fertility since the end result provides the form of nitrogen most available to plants. Nitrification is carried out in two oxidation stages by specific bacteria, and namely, oxidation of ammonia to nitrate by *Nitrosomonas europaea* and *Nitrosococcus nitrosus* and oxidation of nitrite to nitrate by *Nitrobacter winogradskyi*. Organisms of this nitrifying family Nitrobacteraceae will not grow upon the usual culture media support (agar) employed in microbiology.

A limited number of microorganisms have the ability to use molecular nitrogen in the atmosphere as their source of nitrogen; such conversion of molecular nitrogen into nitrogenous compounds is called nitrogen fixation. Two groups of microorganisms are involved in this process, namely, those that live freely and independently in the soil and those that live in close association with the root system of leguminous plants. The former are referred to as nonsymbiotic nitrogen fixers and the latter as symbiotic nitrogen fixers. Non symbiotic nitrogen fixation has been associated primarily with *Clostridium pasteurianum* and species of Azotobacter, the latter being considered to have the greater nitrogen fixing capacity.

These organisms assimilate nitrogen from the air and store it in their bodies until such time as they are absorbed by the protozoa. On the death of the protozoa the combined nitrogen becomes plant food through the agency of the ammonifiers and nitrifiers.

In the course of their metabolic activities, fungi also play an active part in the soil economy and, under aerobic conditions such as occur in most soils, they may be the most important factor in the decomposition of cellulosic matter. It has been found that under experimental conditions three thermophilic soil fungi (Coprinus, Aspergillus, and Acremoniella) can rot down cellulosic matter to a manurial condition as rapidly as the whole soil population and far more rapidly than a synthesized bacterial flora of the soil. Fungi are active also in the decomposition of organic nitrogen compounds and the liberation of ammonia.

However, even through the vital importance of microbial activity to soil fertility has been recognized by man as indicated by the above introductory discussion, and he has been able to develop many chemical fertilizers to help sustain the lives of plants and soil microorganisms, man has succeeded only to a very limited degree in extending the use of microbiology for the conversion of waste products and for soil fertility and recovery. In recent years microorganisms composting compounds have been prepared from sewage sludge or liquids, treated and inactivated so as to render harmless the pathogenic dangers of raw sewage residues. Such sewage treatment necessarily effects some of the organisms and this fact combined with the fact that sewage is usually a variable mixture of substances from many sources, necessarily limits the microbial content and precludes uniformity in such content. Therefore most efforts of conversion of waste materials into usable energy for soil fertility and plant food have been confined to the use of natural guanos, manures, or the composting of organics into usable manure. Composting has taken place mostly above the soil, or in tanks, and with the applied thought of adding enough chemical nitrogen, etc. to make better and cheaper use of the microbiological activity and chemistry. There has been no planned use of microorganisms to supply such chemicals in the form which they are needed for plant life.

With the growth of modern cultivation and the needs of modern civilization, the use of waste materials has become one of the outstanding problems of the age. Nothing can illustrate this more than the waste materials from the timber industry. In the United States alone, approximately 75 million tons of plant and logging residues are produced annually. Of this about 44% is used for fuel or special fuel production, and the rest finds substantially no use at all. Probably the only significant product developed by chemical and microbiological means to utilize woods residues is ethyl alcohol.

Heretofore, efforts to use wood wastes as a soil conditioner or fertilizer have been considered unsatisfactory primarily because all wood debris has a nitrogen deficiency. To elaborate, the microorganisms that accomplish decay need nitrogen for their metabolic processes and growth. Since most of this nitrogen is not available in the wood debris, and hence must be supplied by the soil, there develops a serious conflict between the microorganisms and the plant life for available nitrogen in the soil. As a result, the soil becomes grossly deficient in nitrogen; this deficiency can last from a few months to several years depending upon the type and amount of wood debris introduced to the soil.

The theory of composting, and namely the conversion of organic materials into humus prior to placing in the soil, has been tried with wood as well as other forms of organic wastes, the concept being that any nitrogen deficiency caused by organic action can be offset by the addition of nitrogen fertilizers. The exact amount of fertilizers needed depends entirely upon the rate of decomposition, but in general the proportions needed per ton of sawdust are 20 to 30 lbs. of elemental nitrogen, which in turn means 30 to 60 lbs. of ammonium nitrate or 50 to 100 lbs. of ammonium sulphate. This will start proper composting in pile form, but it is usually advocated that one half said amounts should be added the second year, and even the third year, to obtain the needed results of humus conversion. Even though such composting with the aid of nitrogen fertilizers ultimately gives humus, it can be appreciated that such a process which takes several months and even years for adequate results, is not commercially feasible for most operations.

With these problems and deficiencies in mind the present invention has several important objects including the following:

(1) To provide a practical means and method for inoculating soil or waste materials with microorganisms.

(2) To determine a way to store cultivated microorganisms.

(3) To provide a solid support media which can be substituted for both agar and silica gel and thereby be able to be used for the cultivation of substantially all soil bacteria.

(4) To find additional uses for timber wastes and other waste materials; and (5) To provide means for stimulating natural growth of microorganisms in the soil.

This and other more particular objects and advantages will appear and be understood in the course of the following description and claims. The invention consists in the novel construction and in the adaptation and combination of parts hereinafter described and claimed.

In the laboratory cultivation of microorganisms innumerable culture media are employed together with solid culture support media. Agar is considered the basic support media for bacteria, yeasts and molds, but is not suitable for cultivation of Nitrosomonas and Nitrobacter for which silica gel plates have normally been used.

A suitable liquid culture media for the cultivation of Nitrosomonas is as follows:

| | |
|---|---|
| Water _____liters__ | 10.0 |
| Ammonium sulfate_____gms__ | 20.0 |
| Dipotassium phosphate_____gms__ | 7.5 |
| Dihydrogen potassium phosphate_____gms__ | 2.5 |
| Ferrous sulfate_____gms__ | 0.1 |
| Manganese sulfate_____gms__ | 0.1 |
| Magnesium sulfate_____gms__ | 0.3 |
| Calcium chloride_____gms__ | 0.2 |

A culture medium for Nitrobacter can be prepared by substituting sodium nitrite for ammonium sulfate in the above described medium for Nitrosomonas.

In the case of Azotobacter the following culture media is commonly used with agar as a support medium:

| | |
|---|---|
| Water _____liters__ | 1.0 |
| Dipotassium phosphate_____gms__ | 0.8 |
| Dihydrogen potassium phosphate_____gms__ | 0.2 |
| Magnesium sulfate_____gms__ | 0.2 |
| Sodium chloride_____gms__ | 0.2 |
| Calcium sulfate_____gms__ | 0.1 |
| Ferric sulfate_____gms__ | 0.01 |
| Glucose _____gms__ | 10.0 |

These and culture media for other organisms are well known in microbiology and are not considered as part of the present invention.

However, I have discovered that cellulosic materials make an excellent support medium for culture media and can be used in place of silica gel for nitrifying bacteria as well as being a good substitute for agar. Furthermore, cellulosic materials have the added advantage of also serving as an organic nutrient.

I have further discovered that wood, and especially green coniferous barks reduced to about 10 to 20% moisture content, are particularly desirable as culture media supports for use in the present invention because such contain many fungi and live microbial life that are not readily adapted to culture cultivation. It should be understood that the amount of water content of the bark is of significant importance as regards its use for this purpose because it should be dry enough to readily absorb more moisture and yet wet enough to permit microbial life it normally contains to live.

A significant contribution of this invention is the concept of isolation of a particle of solid culture support medium containing microorganisms and suitable culture media therefor in such a manner that the microorganisms can be stored indefinitely and later activated when desired. I have found that such isolation can be performed by enclosing the particle with a film or barrier which is water repellent in a relatively dry storage environment and is not water repellent at a predetermined higher water level as for example, that to be found in the soil or compost to which the microorganisms are to be introduced. By this procedure the bacteria and other organisms carried by the support medium become dormant during storage as soon as their water consumption has reduced the water content in the support medium to about 2 or 3%. They then are activated merely by the addition of water in the amount necessary to bridge the barrier around the particle of support medium.

I have discovered that the polyorgano-siloxanes provide compounds suitable for use in such a barrier without limitations as to the type of bacteria to be confined. The best silicones for this use are the oils or resins of the methylpolysiloxanes. However, it is not intended to limit the present invention to this group of siloxanes as others experimented with and usable are the Dimethylpolysiloxanes
Octadecylisilsequioxanes
Butymethylpolysiloxanes
Trimethylsiloxanes
Phenylmethylsiloxanes In order to provide the silicone in a form which will not provide a permanent water barrier, I use a silicone soap and this is preferably applied in a wet state and the water therein then removed. For such soap I prefer to use a methylpolysiloxane oil emulsion prepared from the following:

| | Parts |
|---|---|
| Methyl silicone oil | 2 |
| Triethanolamine | 5 |
| Oleic or stearic acid | 5 |
| Water (hot) | 20 |

The oil, amine and acid are mixed together and thoroughly stirred until completely blended; it may be necessary to heat to 150° F. Then the hot water is slowly added to the blend and stirred until a good emulsion is formed. This prepared emulsion is diluted to about 1:10 parts of water for the present purposes.

The use of amines in the emulsion is not limited to triethanolamine, as any of the anionic, cationic or non-ionic amines have proved to be particularly well adapted for culture cultivation of bacteria. I have found that the use of oleic or stearic acid as emulsifiers in no manner hinders the growth of microbial associations when not used in oversized proportions.

In preparation for application to my culture support medium, the common laboratory methods for the raising of the different species of bacteria or other desired organisms are used. Then the laboratory culture (bacteria and culture medium) are mixed with about an equal volume of the diluted methyl silicone oil emulsion. The latter should be luke warm (not over 80° F.). This mixture is then poured over the bark or other support medium at the rate of about one gallon to 20 pounds of bark particles, and the entire mixture is thoroughly mixed and agitated so that all of the liquid is absorbed by the support medium. As an alternative procedure, the culture can be applied first to the support medium followed by the silicone soap. In either case the culture and emulsion permeate the pores of the bark or other support medium and a film of set silicone soap results on the surface of the support medium.

Several species of bacteria together with their various culture media can be combined and applied as a group to the support medium. In most cases I prefer to keep the nitrifying bacteria and Azotobacter isolated.

To dry the silicone soap film or layer on the support medium I employ a material which will gel in water and thus will absorb the water in the soap. Such material must not only have this gelatinating property, but also must not deter culture cultivation and yet be substantially inert. The best materials meeting these qualifications which I have found are the various methylcellulose powders. In general, in the production of such powders caustic soda and methyl chloride are reacted with cotton linters or wood pulp. In either case the cellulose fibers are first swelled by a caustic soda solution to produce alkali cellulose which in turn is treated with methyl chloride to produce dimethyl ether of cellulose. This fibrous reaction when purified may be reduced into a fine uniform dry powder which is a long chain cellulosic polymer and is termed methylcellulose. Such is produced by the Dow Chemical Company, Midland, Michigan, under the trademark "Methocel MC."

For use in the present invention the methylcellulose powder can be used straight or diluted by inert clays and earth particles such as bentonite and calcium marl, and many resins of silicons, phenols, and alkyds make satisfactory diluents. In any such case the dry methylcellulose powder reacts with the moisture content of the wet silicone soap and some of the moisture from the support medium to which the latter is applied to form a gel coating over a dry silicone soap layer which in turn isolates the support medium and the microorganisms and culture media carried thereby. When these microorganisms have reduced the water content of the support medium to about 2 or 3% they become dormant and remain so until the dry silicone soap is again emulsified by sufficient external water. Outwardly of its gelled portion the methylcellulose remains dry and the moisture content thereof should only be about 2 or 3% unless the product is not to be stored. A casual inspection of the product would disclose a dry granular mixture, the sizes of the grains of course being much dependent upon the size of the original particles of bark or other support media material used. Normally I prefer that these particles be quite small, say, about 1/64 inch in each direction. However, such small size is not required in the practice of the invention and hence no limitation in this regard is intended.

During storage of the enclosed particle of support media the microorganisms therein continue to grow until the moisture content of the particle is reduced to the point at which the microbial life becomes inert. By this time partial decomposition of the bark to humus may have occurred. The microorganisms remain dormant until the silicone soap layer is emulsified thereby permitting the moisture content of the support medium to increase and reactivate the microorganisms. Such emulsification will occur when the particle is added to damp soil or compost. The reactivated microorganisms will then complete decomposition of the bark particle with the result that both plant and microbial nutrients will be formed. Inclusion of the primary soil bacteria in such particles including the nitrifying bacteria and Azobacter will insure a continuation of the soil regenerating cycle without a nitrogen deficiency. If the soil is grossly deficient in certain inorganics it is well to add the proper chemical fertilizers when the soil is inoculated with the microorganisms. In fact, this is usually most easily done by combining the gel coated particles with the fertilizer so that both are applied at one time.

The isolation of the culture by the silicone soap barrier and methylcellulose gel is not only important because of the storage factor but also insures that after inoculation of soil therewith, there will not be a sudden dilution. To elaborate, the emulsification and break through of the barrier occurs gradually in the soil and thus the bacteria in the bark particle can thrive within the particle after activation and accomplish breakdown of the particle to humus thereby providing additional nutrients in the soil. Furthermore, the cultivation media and microorganisms in the particle will attract respective organisms already present in the soil and thereby stimulate microbial activity.

When wood wastes are to be composted or applied directly to the soil, I provide a surplus of nitrifying bacteria to insure that there will not be a nitrogen deficiency.

It is believed that the invention will have been clearly understood from the foregoing detailed description of the illustrated preferred embodiment. Minor changes will suggest themselves and may be resorted to without departing from the spirit of the invention, wherefore it is intended that no limitations be implied and that the hereto annexed claims be given a scope fully commensurate with the broadest interpretation to which the employed language admits.

What I claim is:

1. A soil treatment product comprising, a particle of cellulosic material inoculated with bacteria, culture media absorbed by said particle, a layer of a polyorganosiloxane soap on said particle in an amount sufficient to form a water repellant barrier on said particle, and a methylcellulose gel over said layer in an amount sufficient to maintain said barrier in the absence of excess moisture.

2. A soil treatment product comprising, a particle of cellulosic material impregnated with microorganisms and a liquid culture media adapted to support growth of said microorganisms, a dry methylpolysiloxane soap covering said particle in an amount sufficient to form a water repellant barrier on said particle, a methylcellulose gel over said soap, and methylcellulose powder covering said gel both in an amount sufficient to maintain said barrier in the absence of excess moisture.

3. A soil treatment product comprising, cellulosic material impregnated with microorganisms and a culture medium adapted to support their growth, a siloxane film over said material in an amount sufficient to form a water repellant barrier on said material, and methylcellulose gel over said film in an amount sufficient to maintain said barrier in the absence of excess moisture.

4. The product of claim 3 in which said cellulosic material comprises green coniferous bark containing natural fungi and bacteria.

References Cited in the file of this patent

UNITED STATES PATENTS

| | | |
|---|---|---|
| 1,252,332 | Earp-Thomas | Jan. 1, 1918 |
| 1,309,723 | Earp-Thomas | July 15, 1919 |
| 2,004,706 | Nuske | June 11, 1935 |
| 2,083,065 | Heye | June 8, 1937 |
| 2,218,695 | Leatherman | Oct. 22, 1940 |
| 2,474,704 | Thayer | June 28, 1949 |
| 2,995,434 | Burton | Aug. 8, 1961 |

FOREIGN PATENTS

| | | |
|---|---|---|
| 411,040 | Germany | Mar. 24, 1925 |